United States Patent
Huang et al.

(10) Patent No.: US 7,565,558 B2
(45) Date of Patent: Jul. 21, 2009

(54) POWER SAVING METHOD AND SYSTEM FOR A CENTRAL PROCESSING UNIT DISPOSED IN A NON-SNOOPING SLEEP STATE WHEN A PERIPHERAL DEVICE SENDS A BUS MASTER REQUEST

(75) Inventors: Wen Juin Huang, Taipei (TW); Chung-Ching Huang, Taipei (TW); Hao Lin Lin, Taipei (TW); Yeh Cho, Taipei (TW)

(73) Assignee: Via Technologies, Inc., Taipei County (TW)

( * ) Notice: Subject to any disclaimer, the term of this patent is extended or adjusted under 35 U.S.C. 154(b) by 426 days.

(21) Appl. No.: 11/409,974

(22) Filed: Apr. 25, 2006

(65) Prior Publication Data

US 2007/0162772 A1    Jul. 12, 2007

(30) Foreign Application Priority Data

Jan. 12, 2006    (TW) .............................. 95101248 A

(51) Int. Cl.
G06F 1/00 (2006.01)
G06F 1/32 (2006.01)
G06F 13/00 (2006.01)
(52) U.S. Cl. ........................ 713/300; 713/320; 711/146
(58) Field of Classification Search ................. 713/300
See application file for complete search history.

(56) References Cited

U.S. PATENT DOCUMENTS 6,633,987 B2 * 10/2003 Jain et al. .................... 713/300
7,343,502 B2 *  3/2008 Samson et al. .............. 713/320
7,373,534 B2 *  5/2008 Cline ......................... 713/320

FOREIGN PATENT DOCUMENTS

WO    WO98/44405    10/1998

OTHER PUBLICATIONS

"Intel's SL Enhanced Intel486™ Microprocessor Family Technical Backgrounder", http://www.intel.com/design/intarch/applnots/7014.htm, Jun. 1993.

* cited by examiner

Primary Examiner—Suresh K Suryawanshi
(74) Attorney, Agent, or Firm—Rosenberg, Klein & Lee

(57) ABSTRACT

A power saving method and system thereof is disclosed. When the central processing unit is under a non-snooping sleep state and a peripheral device sends a bus master request, a chip will drive the central processing unit waking from the non-snooping sleep state and entering a system management mode for executing an interrupt service routine that makes the central processing unit in halt status. The central processing unit is then driven to enter a snooping sleep state for snooping the bus master request. After the execution of the bus master request, the chip will drive the central processing unit to leave the snooping sleep state and return to the non-snooping sleep state for power consumption conservation.

19 Claims, 3 Drawing Sheets

POWER SAVING METHOD AND SYSTEM FOR A CENTRAL PROCESSING UNIT DISPOSED IN A NON-SNOOPING SLEEP STATE WHEN A PERIPHERAL DEVICE SENDS A BUS MASTER REQUEST

BACKGROUND OF THE INVENTION

1. Field of the Invention

The present invention relates to the field of computer system, and more particularly relates to the conservation of power consumption in a computer system.

2. Description of the Related Art

Nowadays personal computers (PC) have so many functions, such as paper processing, briefing making, information searching, entertainment or education, that PCs have become essential equipment in each enterprise and family. However, as it is inconvenient for users to take the PCs along when they go out, portable computers have become a mainstream in the computer industry for their favorable portability.

As mobile computing devices seek to extend time-of-operation between battery charges, efficient power management has became increasingly important. The most common power management system available now is Advanced Configuration and Power Interface (ACPI) that moves the power management completely to the level of the operating system. The power management states defined by the ACPI include: Global system state (G states), Sleep state (S state), Device state (D state) and Central processor unit state (C state).

FIG. 1 is a schematic drawing illustrating four levels of C state, C0 state, C1 state, C2 state and C3 state. In the C0 state, the central processing unit (CPU) executes instructions normally. The C1, C2, and C3 states are different levels of low power states which are sleeping states. According to the usage of the CPU, the operating system drivers the CPU to enter into C1, C2 or C3 state for reducing power consumption.

Specifically, the C3 state offers improved power savings over the C1 and C2 states. Before the CPU enters the C3 state, a command is sent by the OS to disable arbiter of a chip. Moreover, the events for processing aren't transmitted from the chip to the CPU in the C3 state until the CPU returns to the C0 state. After the arbiter of the chip is disabled, the CPU enters the C3 state immediately. While in the C3 state, the CPU's caches maintain state but the CPU is not required to snoop bus master request or CPU accesses to memory.

However, as the bus master request only is sent when the peripheral devices need to access to system memory of the computer system, it is unworthy for the CPU resumes the full performance state for response the bus master request in view of power conservation. Accordingly, conventional power management method can't manage the power consumption of the processor in the most efficient manner, and the usage time of portable computers is reduced which is unfavorable for the users.

SUMMARY OF THE INVENTION

A power saving method and system thereof are provided. In the method, a central processing unit wake up from a non-snooping sleep state and enter a System Management Mode for response a bus master request in a snooping sleep state, which the central processing unit consumes lower amount of power than in a full performance state.

The power saving system in accordance with the present invention is applied to a computer system having a central processing unit in a non-snooping sleep state that unable to snoop events. The system comprises a memory storing an interrupt service routine, which is able to cause the central processing unit in a halt status, an arbiter transmits the bus master request to the central processing unit, and a chip. When the chip receives a bus master request, the chip will send a first control signal as well as a System Management Interrupt (SMI) signal to the central processing unit for driving the central processing unit to wake up from the non-snooping sleep state, and then enters a system management mode to execute the interrupt service routine. After the central processing unit executes the interrupt service routine, the chip sends a second control signal to the central processing unit for driving the central processing unit entering a snooping sleep state and enabling the arbiter allowing transmission of the bus master request, then the bus master request is snooped by the central processing unit.

The present invention further provides a power saving method for using in a computer system having a central processing unit in a non-snooping sleep state that unable to snoop events. The power saving method comprises a step of sending a first controller signal and a System Management Interrupt signal to the central processing unit for driving the central processing unit to wake up from the non-snooping sleep state and enter a system management mode, and to process an interrupt service routine to make the central processing unit execute a halt instruction, and then sending a second control signal to the central processing unit for driving the central processing unit into a snooping sleep state and enabling an arbiter for transmission the bus master request to the central processing unit, then the bus master request is snooped by the central processing unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
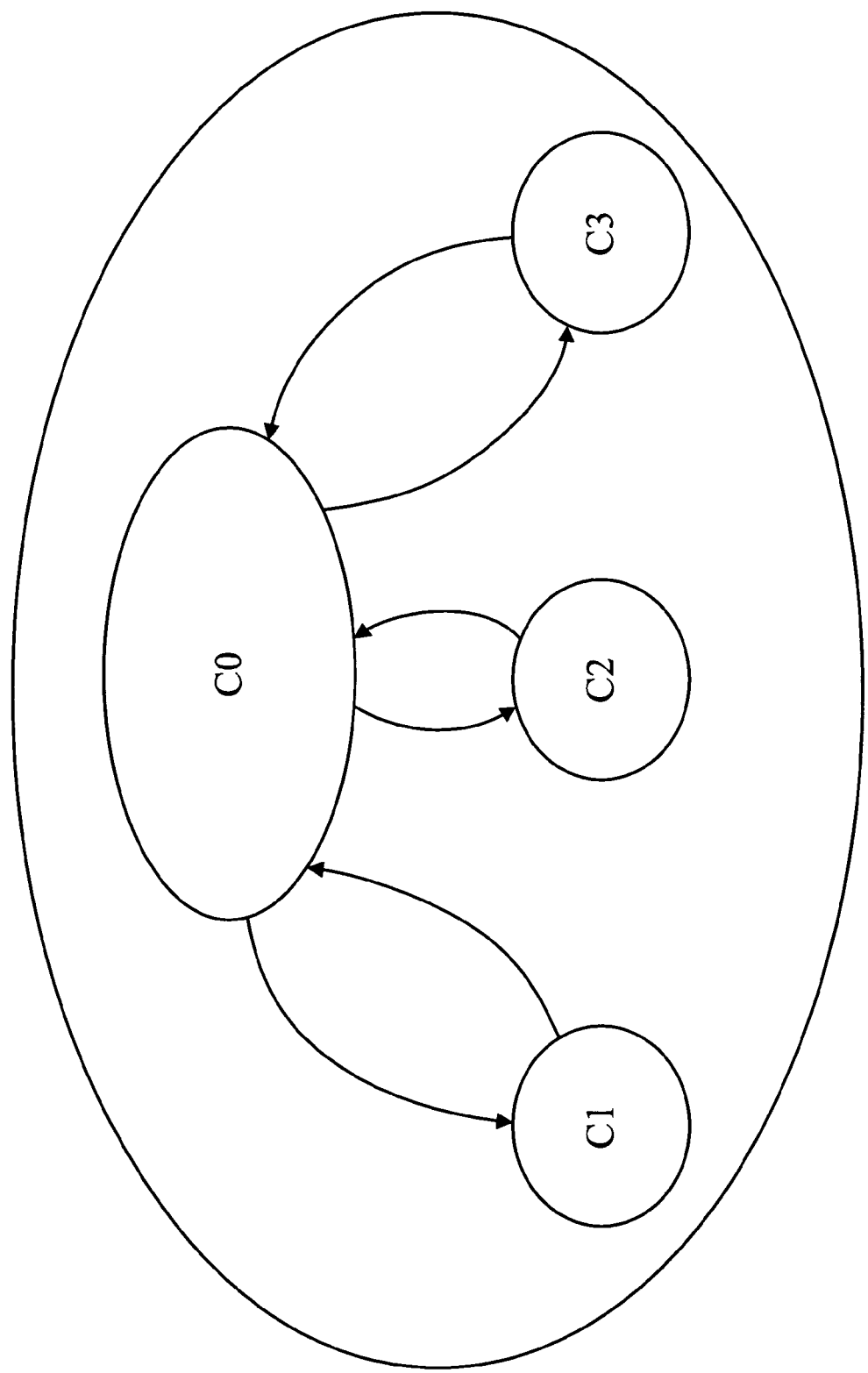
FIG. 1 is a schematic drawing showing processor states of the Advanced Configuration and Power Interface.
Figure 2:
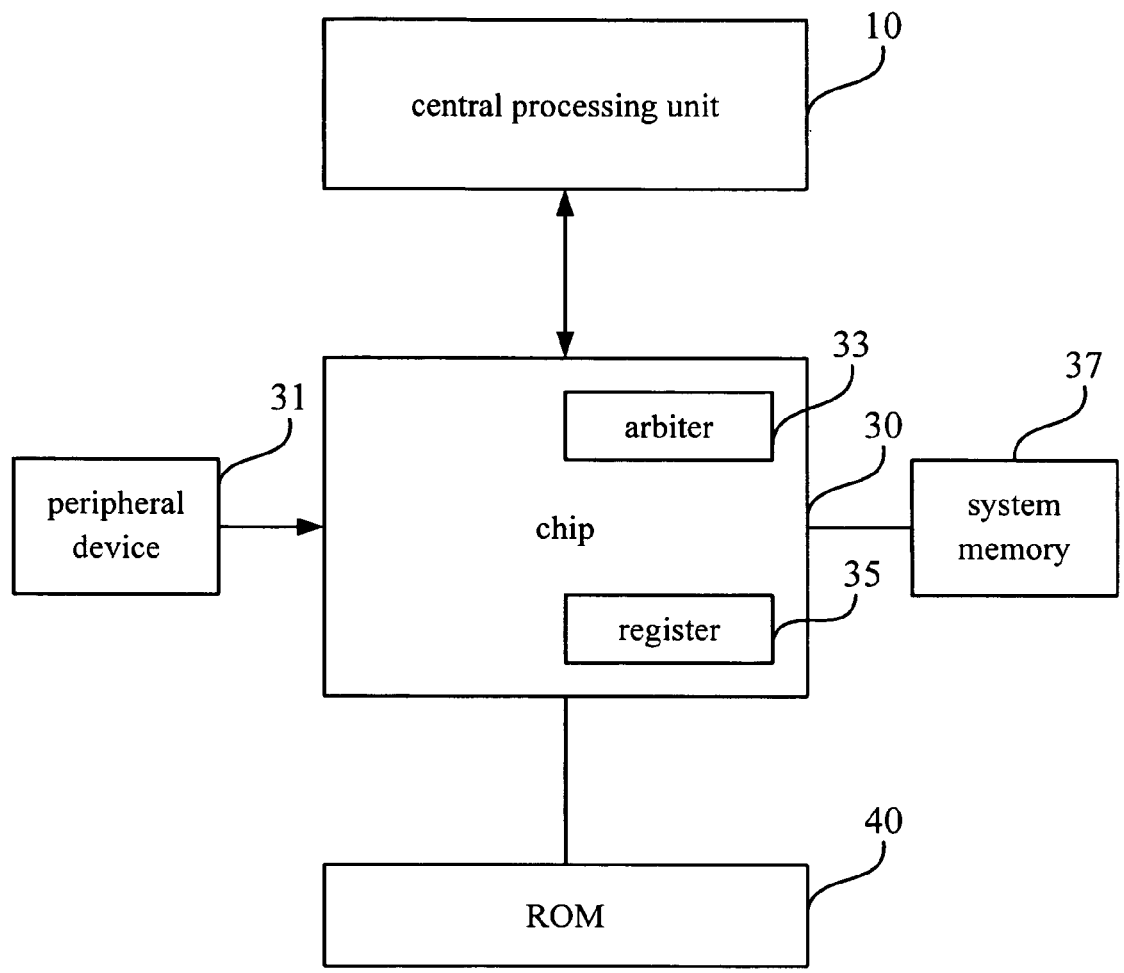
FIG. 2 is a block diagram of an embodiment in accordance with the present invention.

FIG. 2 shows a system in accordance with the present invention. The system includes a central processing unit (CPU) 10 connecting with a chip 30, a peripheral device 31 coupled to the chip 30, a system memory 37 and a read only memory (ROM) 40. An arbiter 33 and a register 35 are disposed on the chip 30 while an interrupt service routine is stored in the ROM 40. The register 35 could be disposed in anywhere else but not limited on the chip 30. Before the CPU 10 enters the C3 state that incapable of snooping, the chip 30 disables the arbiter 33 for preventing events from the peripheral device 31 transmitted to the CPU 10 already in the C3 state.

Figure 3:
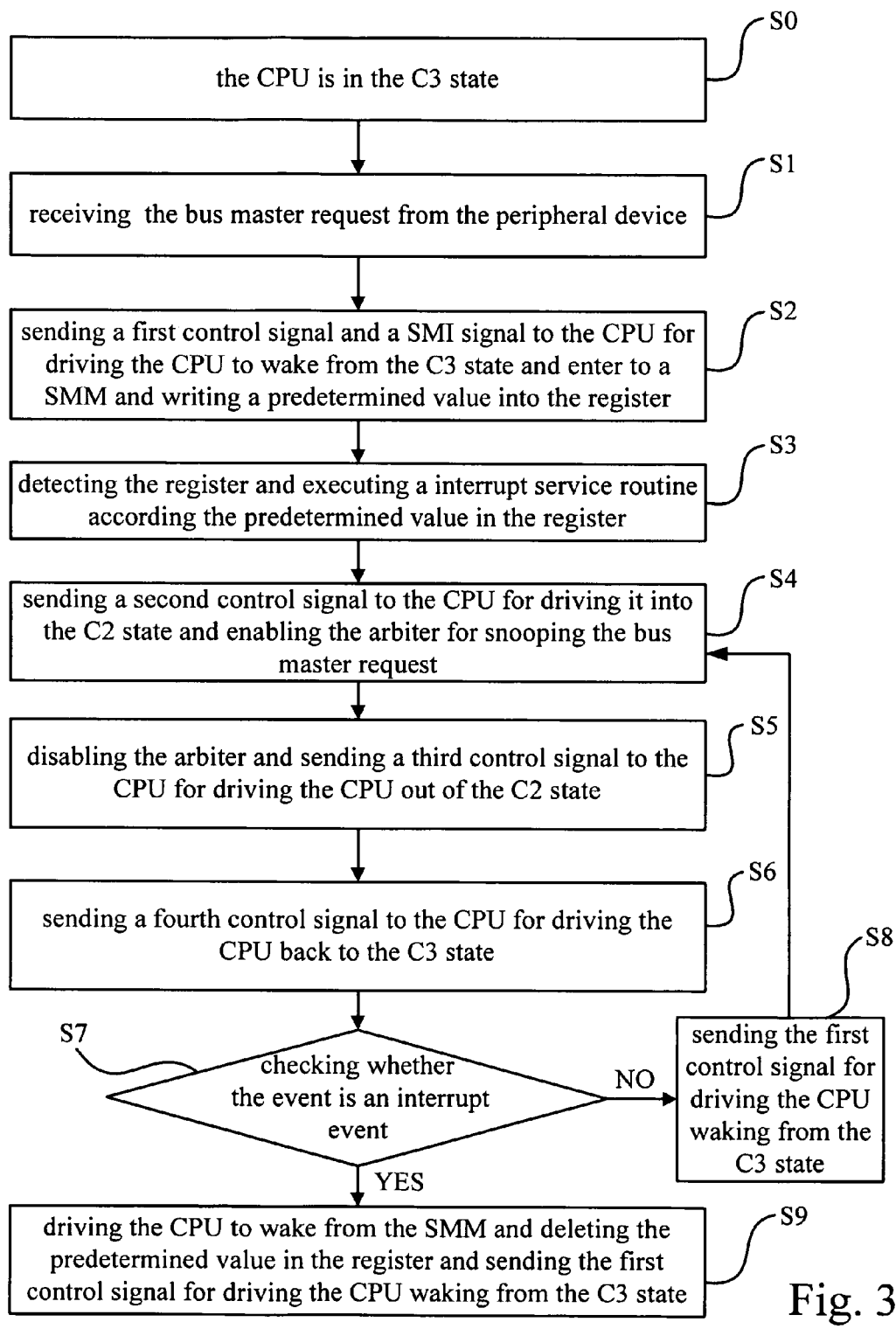
FIG. 3 is a flow chart of an embodiment in accordance with the present invention.

The way for the chip 30 responding to the bus master request from the peripheral device 31, when the CPU 10 has transited into the C3 state, will be described in great detail herein below with the reference of FIG. 2 and FIG. 3.

As shown in step S0, the CPU 10 is switched to the C3 state and the arbiter 33 of the chip 30 is disabled. At step S1, the chip 30 receives the bus master request from the peripheral device 31. After step S1, the chip 30 sends a first control signal to the CPU 10 for driving the CPU 10 to wake up from the C3 state. Because the CPU 10 immediately returns to C0 state for executing instructions and being controlled by the operating system of computers, it can't enter C2 state that snoop event occurs. In order to prevent the CPU 10 from directly switching into the C0 state from the C3 state, when the chip 30 sends the first control signal, the chip 30 sends a System Management Interrupt (SMI) signal to the CPU 10 for driving the CPU 10 to enter a System Management Mode (SMM), and the CPU 10 will be performed independent from the operating system. Moreover, at step S2, the chip 30 writes a predetermined value into the register 35.

Because there are a lot of trigger events able to drive the chip 30 to send the SMI signal to the CPU 10, the chip 30 has to write predetermined values respectively in correspondence with the trigger events into corresponding portions of the register 35. As shown in step S3, the CPU 10 in the SMM will detect all portions of the registers 35 to recognize which register 35 has written the predetermined value. According to the predetermined value, the interrupt service routine in the system memory 37 which is read from the ROM 40 to a System Management RAM (SMRAM) is executed. Noted that the SMI handler which detects the registers 35 is already in the system memory 37 during runtime. The SMI handler is put during POST. Specifically, The SMRAM of the present invention is a specific region of the system memory 37.

The interrupt service routine according to the present invention is performed for driving the CPU 10 to execute the halt instruction when the CPU 10 wakes from C3 state, therefore, the CPU 10 is kept inactive even when it is transited to the C0 state.

After the step S3, the chip 30 takes step S4—sending a second control signal to the CPU 10 for driving it into the C2 state and subsequently enabling the arbiter 33 so as to transmit the bus master request from the peripheral device 31 to the CPU 10 for being snooped.

At step S5, the chip 30 disables the arbiter 33 and sends a third control signal to the CPU 10. The CPU 10 is then switched from the C2 state to the C0 state according to the third control signal. Furthermore, as the CPU 10 in the C0 state is still under the SMM with execution of the halt instruction, the CPU 10 will not read commands in the C0 state. After step S5, the chip 30 in step S6 sends a fourth control signal to the CPU 10, which drives the CPU 10 enters the C3 state for power conserving purpose.

Later, once the chip 30 receives another event from the peripheral device 31, the chip 30 takes step S7, checking the event is an interrupt event or a bus master request. If the event is the bus master request, the chip 30 will run step S8, sending the first control signal to the CPU 10 to wake up the CPU 10 from the C3 state. It is obvious that the process will go back to the step S4 and runs the step S4, step S5 and step S6 in sequence after the step S8.

If the event is an interrupt, the CPU 10 needs to leave the SMM and enter a state controlled by the operating system for processing the interrupt. For this purpose, the chip 30 will take step S9, waking the CPU 10 from the SMM and simultaneously deleting the predetermined value in the register 35. Moreover, the chip 30 will send the first control signal to the CPU 10 for switching the CPU 10 from the C3 state to the C0 state, the C0 state is a normal state which allows execution of instructions. Since the CPU 10 in such state leaves the SMM and is controlled by the operating system, the operating system will drive the chip 30 to enable the arbiter 33 for transmission of the interrupt event.

In summary, a power saving method and system thereof in accordance with the present invention uses System Management Mode to drive the central processing unit response to a bus master request under a snooping sleep state that consumes the least amount of power. When the central processing unit is under a non-snooping sleep state and a bus master request is sent from a peripheral device, the central processing unit will be waked from the non-snooping sleep state and enter the System Management Mode without control of the operating system, and the central processing unit is then switched into the snooping sleep state to snoop the bus master request with lower power consumption. Obviously, power consumption of the computer system is quite reduced by this power conserving method, and the time-of-operation of the battery-powered, portable applications is correspondingly extended.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A power saving method for a central processing unit disposed in a C3 state when a peripheral device sends a bus master request, comprising:
   sending a first control signal and a System Management Interrupt signal to the central processing unit for driving the central processing unit to wake up from the C3 state and enter a System Management Mode;
   executing an interrupt service routine to make the central processing unit execute a halt instruction, whereby the central processing unit is placed in an inactive C0 state; and
   sending a second control signal to the central processing unit for driving the central processing unit into a C2 state and enabling an arbiter for transmission of the bus master request to the central processing unit.

2. The method as claimed in claim 1, further comprising:
   writing a predetermined value into a register; and
   executing the interrupt service routine corresponding to the predetermined value.

3. The method as claimed in claim 2, wherein the predetermined value is deleted when the central processing unit leaves the System Management Mode.

4. The method as claimed in claim 1, wherein after execution of the bus master request, disabling the arbiter and sending a third and a fourth control signals to drive the central processing unit entering into the C3 state from the C2 state.

5. The method as claimed in claim 4, further comprising:
   forcing the central processing unit to leave the System Management Mode when the peripheral device sending an interrupt even;
   forcing the central processing unit to enter a C0 state from the C3 state according to the first control signal and enabling the arbiter; and
   transmitting the interrupt even to the central processing unit.

6. The method as claimed in claim 1, wherein the interrupt service routine is stored in a memory.

7. A power saving method, for a central processing unit disposed in a non-snooping sleep state when a peripheral device sends a bus master request, comprising:
   sending a first control signal as well as a System Management Interrupt signal to the central processing unit for waking the central processing unit from the non-snooping sleep state and entering a System Management Mode;

executing an interrupt service routine to make the central processing unit execute a halt instruction, whereby the central processing unit is placed in an inactive normal state; and sending a second control signal to the central processing unit for driving the central processing unit to enter into a snooping sleep state and enabling an arbiter able to transmitting the bus master request to the central processing unit.

8. The method as claimed in claim 7, further comprising:
writing a predetermined value into a register; and
executing the interrupt service routine corresponding to the predetermined value.

9. The method as claimed in claim 8, wherein the predetermined value is deleted when the central processing unit leaves the System Management Mode.

10. The method as claimed in claim 7, further comprising:
disabling the arbiter, and sending a third and a fourth control signals to the central processing unit for forcing the central processing unit entering into the non-snooping sleep state from the snooping sleep state.

11. The method as claimed in claim 10, further comprising:
forcing the central processing unit to leave the System Management Mode when the peripheral device sending an interrupt even;
forcing the central processing unit to enter a normal state from the non-snooping sleep state according to the first control signal and enabling the arbiter; and
transmitting the interrupt even to the central processing unit.

12. The method as claimed in claim 7, wherein the interrupt service routine is stored in a memory.

13. A power saving system, for a central processing unit under a non-snooping sleep state when a peripheral device sends a bus master request, comprising:
a memory, for storing an interrupt service routine operable to cause the central processing unit to maintain a halt status, whereby the central processing unit is placed in an inactive normal state;
an arbiter, for transmitting the bus master request to the central processing unit; and
a chip, for receiving the bus master request and sending a first control signal and a System Management Interrupt signal to the central processing unit, and waking up the central processing unit from the non-snooping sleep state and entering a System Management Mode to execute the interrupt service routine;
wherein after execution of the interrupt service routine of the central processing unit, the chip sends a second control signal to the central processing unit for driving the central processing unit to enter a snooping sleep state and enables the arbiter to allow transmission of the bus master request.

14. The system as claimed in claim 13, further comprising a register storing a predetermined value, wherein when the chip sends the first control signal and the System Management Interrupt signal to the central processing unit, the chip writes the predetermined value into the register so that the central processing unit can execute the interrupt service routine according to the predetermined value.

15. The system as claimed in claim 14, wherein the chip deletes the predetermined value when the central processing unit is out of the System Management Mode.

16. The system as claimed in claim 14, wherein the register is disposed on the chip.

17. The system as claimed in claim 13, wherein after execution of the bus master request by the central processing unit, the chip disables the arbiter and sends a third control signal as well as a fourth control signal which are able to cause the central processing unit waking from the snooping sleep state and returning to the non-snooping sleep state.

18. The system as claimed in claim 17, further comprising:
forcing the central processing unit to leave the System Management Mode and sending the first control signal to the central processing unit by the chip when receiving an interrupt even from the peripheral device;
forcing the central processing unit to enter a normal state from the non-snooping sleep state according to the first control signal and enabling the arbiter; and
transmitting the interrupt even to the central processing unit.

19. The system as claimed in claim 13, wherein the arbiter is disposed on the chip.

* * * * *